United States Patent
Furuta

(10) Patent No.: US 9,572,069 B2
(45) Date of Patent: Feb. 14, 2017

(54) RADIO BASE STATION AND COMMUNICATION CONTROL METHOD

(71) Applicant: FUJITSU LIMITED, Kawasaki-shi, Kanagawa (JP)

(72) Inventor: Daitarou Furuta, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 142 days.

(21) Appl. No.: 14/661,756

(22) Filed: Mar. 18, 2015

(65) Prior Publication Data

US 2015/0296408 A1 Oct. 15, 2015

(30) Foreign Application Priority Data

Apr. 10, 2014 (JP) ................. 2014-081450

(51) Int. Cl.

| | |
|---|---|
| *H04W 72/04* | (2009.01) |
| *H04W 76/04* | (2009.01) |
| *H04W 88/06* | (2009.01) |
| *H04W 28/08* | (2009.01) |
| *H04W 28/02* | (2009.01) |
| *H04W 28/12* | (2009.01) |
| *H04W 76/02* | (2009.01) |
| *H04W 92/20* | (2009.01) |
| *H04W 36/00* | (2009.01) |
| *H04W 36/22* | (2009.01) |

(52) U.S. Cl.
CPC ......... *H04W 28/0289* (2013.01); *H04W 28/12* (2013.01); *H04W 76/027* (2013.01); *H04W 36/0027* (2013.01); *H04W 36/22* (2013.01); *H04W 92/20* (2013.01)

(58) Field of Classification Search
CPC .. H04W 24/08; H04W 28/0289; H04W 28/12; H04W 36/0027; H04W 36/22; H04W 76/025; H04W 76/026; H04W 76/027; H04W 92/20
See application file for complete search history.

(56) References Cited

U.S. PATENT DOCUMENTS

| | | | |
|---|---|---|---|
| 7,024,203 B1* | 4/2006 | Naghian | H04W 28/18 455/436 |
| 8,995,262 B2* | 3/2015 | Chowdhury | H04L 12/5695 370/230 |
| 9,131,495 B2* | 9/2015 | Teyeb | H04W 36/0011 |
| 9,398,473 B2* | 7/2016 | Goerke | H04W 24/02 |
| 2005/0013273 A1* | 1/2005 | Zhang | H04W 28/16 370/328 |

(Continued)

FOREIGN PATENT DOCUMENTS

JP 2011-250211 A 12/2011

*Primary Examiner* — Ahmed Elallam
(74) *Attorney, Agent, or Firm* — Arent Fox LLP

(57) ABSTRACT

A radio base station including: a first interface configured to communicate with a different radio base station via a network among radio base stations, a second interface configured to wirelessly communicate with a radio terminal, and a processor configured to control a transmission of a first signal to the radio terminal when a load of the network among the radio base stations is higher than a given level, the first signal indicating to reject a second signal transmitted from the radio terminal, the second signal requesting to add a bearer between the radio base station and the radio terminal via the different radio base station.

18 Claims, 16 Drawing Sheets

(56) References Cited

U.S. PATENT DOCUMENTS

| | | |
|---|---|---|
| 2013/0072212 A1 | 3/2013 | Nakamura et al. |
| 2014/0080484 A1* | 3/2014 | Centonza ............ H04W 76/045 455/436 |
| 2014/0092866 A1* | 4/2014 | Teyeb ................. H04W 76/045 370/331 |
| 2014/0128074 A1* | 5/2014 | Vangala ................ H04W 36/22 455/436 |
| 2014/0206361 A1* | 7/2014 | Centonza ............ H04W 76/045 455/444 |
| 2014/0219248 A1* | 8/2014 | Reddiboyana ........ H04W 36/14 370/331 |
| 2014/0241317 A1* | 8/2014 | Jamadagni .......... H04W 76/025 370/331 |
| 2015/0045052 A1* | 2/2015 | Pao ....................... H04W 88/06 455/453 |
| 2015/0109927 A1* | 4/2015 | Ozturk .............. H04W 36/0027 370/235 |
| 2015/0131535 A1* | 5/2015 | Wallentin ............ H04W 76/025 370/329 |
| 2015/0181473 A1* | 6/2015 | Horn ................. H04W 36/0027 370/331 |

* cited by examiner

FIG. 14

| PRIORITY | HIGH > LOW | | | |
|---|---|---|---|---|
| | Priority1(P1) | Priority2(P2) | Priority3(P3) | Priority4(P4) |
| TYPES | LI CONTROL PACKET | NAS PACKET | NORMAL DATA | NORMAL DATA WHEN OVERFLOW OCCURS |
| TRANSMISSION SOURCE | RADIO RESOURCE CONTROL UNIT | MME | OTHERS | OTHERS |
| IMPARTING BLOCK | RADIO RESOURCE CONTROL UNIT | IF | IF | IF |

RADIO BASE STATION AND COMMUNICATION CONTROL METHOD

CROSS-REFERENCE TO RELATED APPLICATION

This application is based upon and claims the benefit of priority of the prior Japanese Patent Application No. 2014-081450, filed on Apr. 10, 2014, the entire contents of which are incorporated herein by reference.

FIELD

The embodiment discussed herein is related to a radio base station.

BACKGROUND

Various ideas have been devised in order to increase a transmission capacity in the radio communication system (hereinafter, referred to as a "system capacity" in some cases) of the related art. For example, in 3rd generation partnership project long term evolution (3GPP LTE), a technique for increasing the system capacity by utilizing a "small cell" other than a "micro cell" has been discussed. Here, the "cell" is a term which indicates a range covered by a radio base station so that a radio terminal transmits and receives a radio signal, but since the concept of the radio base station and the concept of the cell almost correspond to each other, the "cell" and the "radio base station" may be properly replaced with each other in the following description. Then, the "micro cell" represents a cell of a base station capable of transmitting a signal at a high transmission power level, that is, a cell of a base station having a large coverage area. In addition, the "small cell" is a cell of a base station transmitting a signal at a low transmission power level, that is, a cell of a base station having a small coverage area.

In the 3GPP LTE, as a configuration of a mobile communication system, for example, a configuration of including a plurality of small cells in the micro cell has been considered. In addition, a technique of concurrently connecting the micro cell and the small cell to the mobile terminal has been considered. Additionally, a technique of concurrently connecting two small cells, which are different from each other, to the mobile terminal has been considered. In this manner, the communication executed by being connected two different cells to the mobile terminal is referred to as dual connectivity in some cases. In addition, the base station, with the dual connectivity, is directly connected to a device of a superordinate layer in some cases. Note that there is no limit to this configuration. Generally, the dual connectivity is configured so that the terminal is connected to a plurality of base stations and thus concurrently communicates with each of the base sections, thereby transmitting and receiving different pieces of information concurrently with each of the base stations. In the description, the dual connectivity will be described, but similar discussion may be applied to a case of multiple-connectivity, that is, more than ternary connectivity. For this reason, the dual connectivity in the following description may be regarded as the concept including the multiple-connectivity, or may be replaced with the multiple-connectivity.

In a case where the mobile terminal concurrently is connected to the micro cell and the small cell, for example, a control plane for transmitting L3 control information is connected to the micro cell, which performs the setting of a transmission line for transmitting data and the control of a handover. In addition, a data plane for transmitting and receiving data is connected to the small cell. Here, the control plane is also referred to as a C-plane or a signaling radio bearer (SRB). Further, the data plane is also referred to as a user plane, a U-plane, or a data radio bearer (DRB).

In addition, in a case where the mobile terminal is concurrently connected to two different small cells, for example, a configuration in which the control plane is connected to one small cell and the data plane is connected to the other small cell, or a configuration in which the data plane is connected to both of the base stations may be considered. As described above, generally, the dual connectivity is configured so that the terminal is connected to a plurality of base stations and thus concurrently communicates with each of the base sections, thereby transmitting and receiving different pieces of information concurrently with each of the base stations.

As such, in the dual connectivity, a radio base station to which the control plane is connected is referred to as a primary radio base station (cell) in some cases. In addition, a radio base station (cell) to which the data plane is connected and which cooperates with the primary radio base station (cell) to perform data communication is referred to as the secondary radio base station in some cases. In addition, each of them is referred to as an anchor radio base station (cell), or an assisting radio base station (cell) in some cases. Furthermore, each of them is referred to as a master radio base station (cell) or a slave radio base station (cell) in some cases. Here, in a case of the dual connectivity, when a radio communication terminal is capable of receiving data from two radio base stations, both of the primary and secondary radio base stations may be configured to output data to the radio communication terminal so as to improve communication properties. Note that names of the radio base stations are not limited to those in this description. Generally, similar to an LTE communication system of the related art, as long as the radio base station which performs communication by connecting both of the control plane and the data plane is a main base station, it is possible to use various names within the scope of the disclosures.

As a configuration of the dual connectivity, various configurations have been proposed according to layers separating the data plane.

For example, there is a configuration of separating the data plane in a previous stage of a packet data convergence protocol (PDCP) layer. In addition, for example, there is a configuration of separating the data plane between the PDCP layer and a radio link control (RLC) layer. Furthermore, for example, there is a configuration of separating the data plane between the RLC layer and a medium access control (MAC) layer. However, a configuration of separating in the layer may be employed without limiting the above described configurations. For example, it is possible to employ a configuration in which the primary base station performs a function of a portion of the PDCP layer, and the secondary base station performs the remaining functions of the PDCP layer. In addition, the same is also true for the RLC layer and the MAC layer.

When employing the configuration of the dual connectivity, the primary radio base station and the secondary radio base station are connected to each other via a wired link or a wireless link. Then, after separating the data plane, data is transmitted to the secondary radio base station via a link connecting the primary radio base station and the secondary radio base station.

An example of the related art includes Japanese Laid-open Patent Publication No. 2011-250211.

SUMMARY

According to an aspect of the invention, a radio base station includes a first interface configured to communicate with a different radio base station via a network among radio base stations, a second interface configured to wirelessly communicate with a radio terminal, and a processor configured to control a transmission of a first signal to the radio terminal when a load of the network among the radio base stations is higher than a given level, the first signal indicating to reject a second signal transmitted from the radio terminal, the second signal requesting to add a bearer between the radio base station and the radio terminal via the different radio base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram explaining an example of a processing operation of the first radio base station in Example 2.

DESCRIPTION OF EMBODIMENTS

Figure 1:
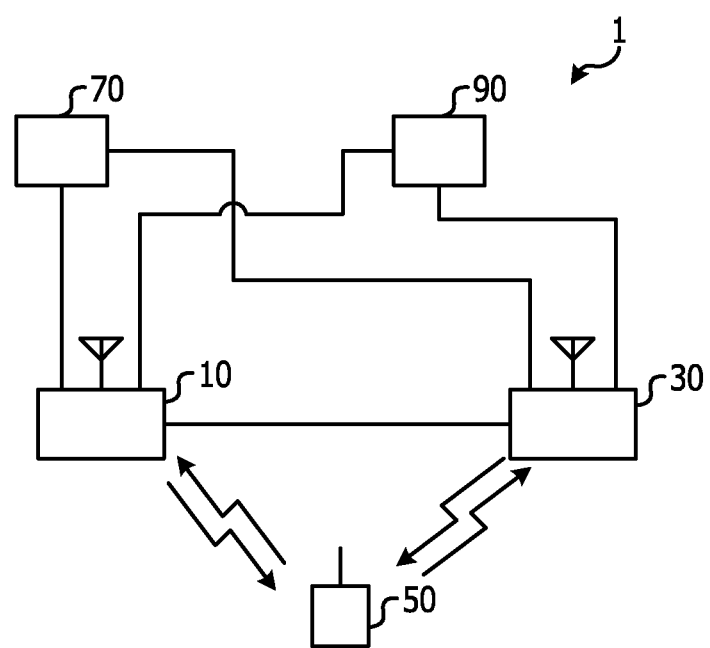
FIG. 1 is a diagram illustrating an example of a radio communication system in Example 1.

In addition to user data, a control signal between a radio communication terminal and a core network (for example, a non-access stratum (NAS) control signal) is transmitted through a transmission line between a master radio base station and a slave radio base station (for example, a transmission line X2). An NAS protocol is a protocol used between a mobility management entity (MME) which is an example of a core network node and a radio terminal. In the related art, the radio base station is not equipped with a function of the NAS protocol. Therefore, in the related art, it is not possible to determine whether a signal which is transmitted through the transmission line between the master radio base station and the slave radio base station is user data or the NAS control signal. For this reason, in the related art, when the transmission quantity of the user data is increased in the transmission line between the master radio base station and the slave radio base station, the control signal which is desired to be preferentially transmitted is likely to be transmitted after the transmission of the user data. Meanwhile, such a problem is applicable to not only a case of the dual connectivity but also a case where the first radio base station communicates with the radio terminal via the second radio base station.

The disclosed technique was made in consideration of the above described circumstance, and an object thereof is to provide a radio base station capable of reducing transmission delay of a control signal in a transmission line between a radio base station and a radio base station.

Hereinafter, the radio base station disclosed in the application will be described based on the drawings of the embodiment. Note that the radio base station disclosed in the application is not limited to the embodiment. In addition, like reference numerals are given to like components having the same functions in the embodiment, and repeated description will be omitted.

Example 1

Outline of Radio Communication System

FIG. 1 is a diagram illustrating an example of a radio communication system in Example 1. In FIG. 1, a radio communication system 1 includes radio base stations 10 and 30, a radio terminal 50, an MME 70, and a gateway (GW) 90. The radio base station 10 is assumed to communicate with the radio terminal 50 via the radio base station 30. Meanwhile, a radio transmission line may be further used to directly connect the radio base station 10 and the radio terminal 50 in this communication. In addition, in the following description, the radio base station 10 is referred to as a "first radio base station" and the radio base station 30 is referred to as a "second radio base station" in some cases. Further, for example, the radio base station 10 is the aforementioned master radio base station, and the radio base station 30 is the aforementioned slave radio base station.

The radio base station 10 transmits a signal transmitted from the network side (that is, the MME 70 and the GW 90) to the radio base station 30. In other words, a signal transmitted from the transmission line between the radio base station 10 and the radio base station 30 (hereinafter, referred to as a "transmission line between base stations" in some cases) includes an NAS control signal transmitted from the MME 70 and user data transmitted from the GW 90.

In addition, the radio base station 10 monitors whether or not a load of the transmission line between base stations is equal to or greater than a predetermined level. Then, the radio base station 10 performs control of the release of its own bearer which is additionally requested from the radio terminal (including the radio terminal 50 and other radio terminals) when the load of the transmission line between the base stations is equal to or greater than a predetermined level. This "control of the release of its own bearer which is additionally requested from the radio terminal (including the radio terminal 50 and other radio terminals)" is, for example, the control of not establishing the bearer which is a target of the additional request with respect to the radio terminal which is a transmission source of the additional request, that is, the control of causing the additional request from the radio terminal which is the transmission source of the additional request to be ineffective (namely, to be rejected).

Here, between the radio base station 10 and the radio terminal 50, a request (hereinafter, referred to as a "connection request" or a "default request" in some cases) which establishes a default bearer (that is, a C-plane bearer) is transmitted from the radio terminal 50 to the radio base station 10 at first. The radio base station 10 returns a "default response" (that is, an instruction of connection set up) with respect to the default request, and thus, the bearer of the default is established. Then, an additional bearer is established by adding the bearer of the default. In order to establish the additional bearer, a message transmitted from the radio terminal 50 to the radio base station 10 is the additional request. When the radio base station 10 transmits the message (that is, an additional response) which indicates accepting of the additional request with respect to the radio terminal 50, the additional bearer is established. Note that the bearer of the default is a bearer to which the control signal is transmitted, and the additional bearer is a bearer to which the user data is mainly transmitted.

In contrast, as described above, the radio base station 10 performs control of the release of its own bearer which is additionally requested from the radio terminal (including the radio terminal 50 and other radio terminals) when the load of the transmission line between base stations is equal to or greater than a predetermined level. For example, the radio base station 10 transmits the "additional bearer release", as a response with respect to the additional request, to the radio terminal which is the transmission source of the additional request. When the radio terminal which is the transmission source of the additional request receives the "additional bearer release", the additional request is made ineffective (namely, the additional request is rejected). Due to this, since the establishment of the additional bearer which is mainly used for the transmission of the user data is limited, it is possible to reduce the user data transmitted through the transmission line between base stations. As a result, since the user data amount which becomes a transmission competitor of the control signal is reduced in the transmission line between base stations, it is possible to decrease a transmission delay of the control signal.

Here, the radio base station 10 may determine that the load of the transmission line between base stations is equal to or greater than a predetermined level when the transmission quantity is equal to or greater than a "first threshold" in the transmission line between base stations. Alternatively, the radio base station 10 may determine that the load of the transmission line between base stations is equal to or greater than a predetermined level when the number of the radio terminals which are wirelessly connected to the radio base station 10 is equal to or greater than a "second threshold". Alternatively, the radio base station 10 may determine that the load of the transmission line between base stations is equal to or greater than a predetermined level when the transmission quantity in the transmission line between base stations is equal to or greater than the "first threshold" and the number of the radio terminals which are wirelessly connected to the radio base station 10 is equal to or greater than the "second threshold". In the following description, configurations will be described, which apply, as a condition of the determination that the load of the transmission line between base stations is equal to or greater than a predetermined level, the conditions that the transmission quantity in the transmission line between base stations is equal to or greater than the "first threshold" and the number of the radio terminals which are wirelessly connected to the radio base station 10 is equal to or greater than the "second threshold".

Configuration Example of First Radio Base Station

Figure 2:
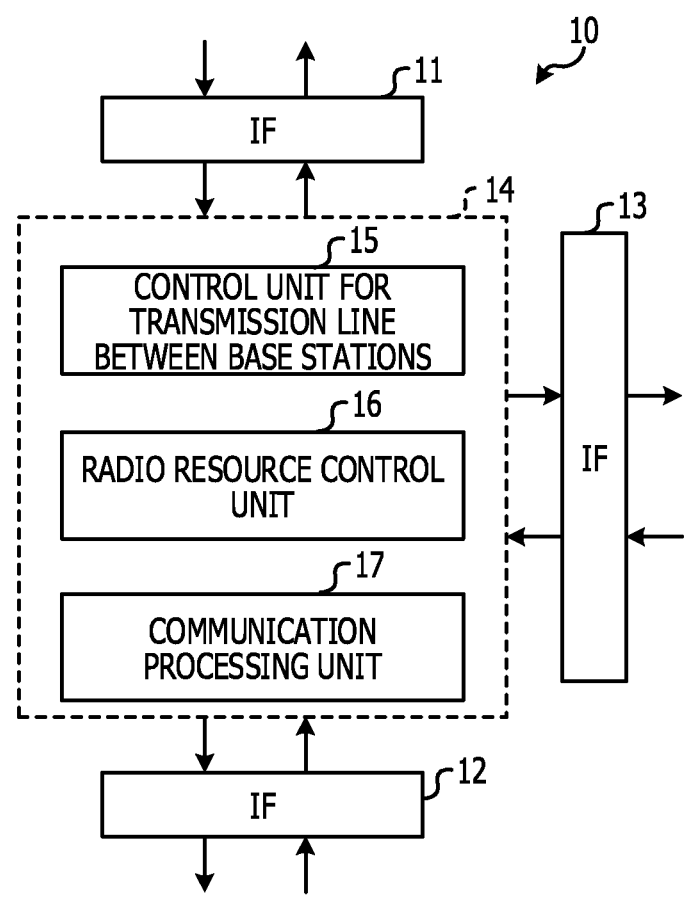
FIG. 2 is a block diagram illustrating an example of a first radio base station in Example 1.

FIG. 2 is a block diagram illustrating an example of a first radio base station in Example 1. In FIG. 2, the radio base station 10 includes interfaces (IFs) 11, 12, and 13, and a control unit 14. The control unit 14 includes a control unit for transmission line between base stations 15, a radio resource control unit 16, and a communication processing unit 17.

The IF 11 is an interface between the MME 70 and the GW 90, that is, an interface on the core network side.

In addition, the IF 12 is a radio interface between the radio terminals.

Further, the IF 13 is an interface between the base stations between radio base stations 30, and for example, is an interface X2. The IF 13 measures a bit rate, that is, the transmission quantity in a serial manner, and then outputs information regarding the measured transmission quantity to the control unit for transmission line between base stations 15. The IF 13 corresponds to a high level data link control (HDLC) layer.

Figure 3:
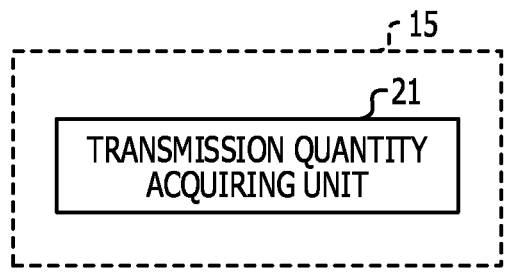
FIG. 3 is a block diagram illustrating an example of a control unit for transmission line between base stations in Example 1.

The control unit for transmission line between base stations 15 acquires the transmission quantity in the transmission line between base stations. The control unit for transmission line between base stations 15 includes, as illustrated in FIG. 3, a transmission quantity acquiring unit 21, and acquires the transmission quantity in the transmission line between base stations from the IF 13 by the transmission quantity acquiring unit 21. The control unit for transmission line between base stations 15 corresponds to a link access procedure balanced (LAPB) layer. FIG. 3 is a block diagram illustrating an example of a control unit for transmission line between base stations in Example 1.

The radio resource control unit 16 monitors whether or not a load of the transmission line between base stations is equal to or greater than a predetermined level. Then, the radio resource control unit 16 performs control of the release of the radio base station 10's own bearer which is additionally requested from the radio terminal (including the radio terminal 50 and other radio terminals) when the load of the transmission line between the base stations is equal to or greater than a predetermined level. As described above, the "control of the release of the radio base station 10's bearer which is additionally requested from the radio terminal (including the radio terminal 50 and other radio terminals)" is, for example, the control of not establishing the bearer which is a target of the additional request with respect to the radio terminal which is a transmission source of the additional request, that is, the control of causing the additional request from the radio terminal which is the transmission source of the additional request to be ineffective. The radio resource control unit 16, for example, corresponds to each of layers of Radio Resource Control (RRC) and PDCP.

Figure 4:
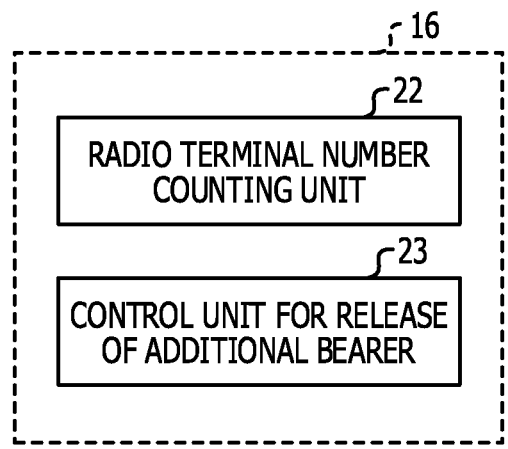
FIG. 4 is a block diagram illustrating an example of a radio resource control unit in Example 1.

For example, the radio resource control unit 16 includes, as illustrated in FIG. 4, a radio terminal number counting unit 22 and a control unit for release of additional bearer 23.

FIG. 4 is a block diagram illustrating an example of a radio resource control unit in Example 1.

The radio terminal number counting unit 22 counts the number of the radio terminals which are wirelessly connected to the radio base station 10.

The control unit for release of additional bearer 23 performs control of the release of the radio base station 10's bearer which is additionally requested from the radio terminal (including the radio terminal 50 and other radio terminals) when the load of the transmission line between the base stations is equal to or greater than a predetermined level. Here, as a condition of the determination that the load of the transmission line between base stations is equal to or greater than a predetermined level, there are the conditions that the transmission quantity in the transmission line between base stations is equal to or greater than the "first threshold" and the number of the radio terminals which are wirelessly connected to the radio base station 10 is equal to or greater than the "second threshold". For example, when the condition is satisfied, the control unit for release of additional bearer 23 transmits the "additional bearer release" to the radio terminal which is the transmission source of the additional request as a response with respect to the additional request. When the radio terminal which is the transmission source of the additional request receives the "additional bearer release", the additional request is made ineffective. Due to this, since the establishment of the additional bearer which is mainly used for the transmission of the user data is limited, it is possible to reduce the user data transmitted through the transmission line between base stations. As a result, since an amount of the user data which becomes a transmission competitor of the control signal is reduced in the transmission line between base stations, it is possible to decrease a transmission delay of the control signal. Here, it is assumed that the control unit for release of additional bearer 23 transmits the "additional bearer release" to the radio terminal which is the transmission source of the additional request; however, the "throughput control signal" may be transmitted with respect to a radio base station 30 without limiting the above configuration. In this case, a state of a control unit for transmission line between base stations 34 of the radio base station 30 described later transitions to an "overflow state". Then, when the control unit for transmission line between base stations 34 of the radio base station 30 described later receives the "additional request" of the bearer of the radio base station 10 from the radio terminal, the "additional bearer release" may be transmitted to the radio terminal which is the transmission source of the additional request as the response with respect to the additional request.

Returning to the description of FIG. 2, the communication processing unit 17 includes a retransmission control function, a transmission sequencing function, a scheduling function, or the like. The communication processing unit 17 corresponds to, for example, each layer of L1 (layer 1), MAC, RLC, and PDCP.

Configuration Example of Second Radio Base Station

Figure 5:
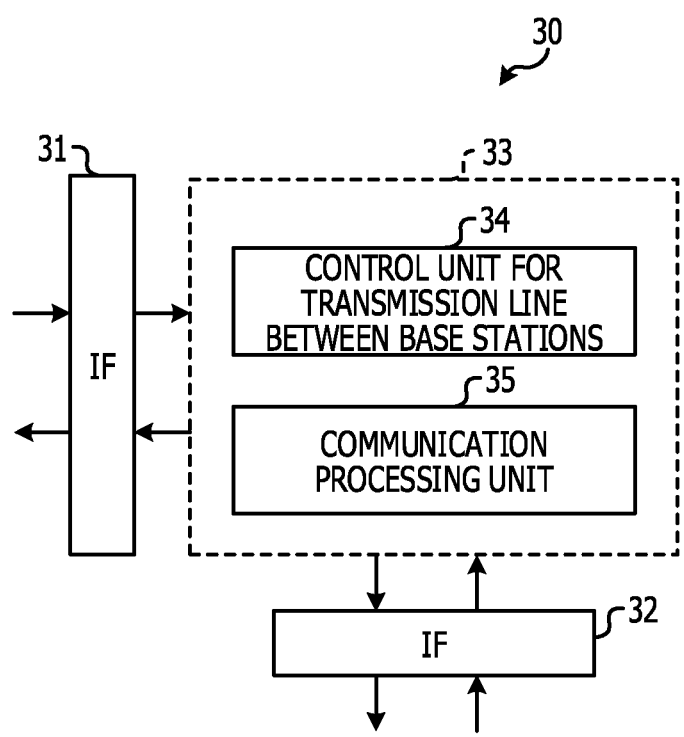
FIG. 5 is a block diagram illustrating an example of a second radio base station in Example 1.

FIG. 5 is a block diagram illustrating an example of a second radio base station in Example 1. In FIG. 5, the radio base station 30 includes IFs 31 and 32 and a control unit 33. The control unit 33 includes the control unit for transmission line between base stations 34 and a communication processing unit 35.

The IF 31 is an interface between the base stations between radio base stations 10, and for example, is an interface X2. The IF 31 corresponds to a high level data link control (HDLC) layer.

The IF 32 is a radio interface between the radio terminals.

The control unit for transmission line between base stations 34 outputs a signal transmitted from the radio base station 10 to the communication processing unit 35. In addition, the control unit for transmission line between base stations 34 transmits a signal received from the communication processing unit 35 to the radio base station 10 via the IF 31. The control unit for transmission line between base stations 34 corresponds to a LAPB layer. Note that, as described above, when the control unit for transmission line between base stations 34 receives a "throughput control signal" from the control unit for release of additional bearer 23, the control unit for transmission line between base stations 34 may transition its own state from a normal state to the "overflow state". In a case of the "overflow state", when the control unit for transmission line between base stations 34 receives the "additional request" of the bearer of the radio base station 10 from the radio terminal via the IF 32 and the communication processing unit 35, as the response with respect to the additional request, the "additional bearer release" is transmitted to the radio terminal which is the transmission source of the additional request.

The communication processing unit 35 includes a retransmission control function, a transmission sequencing function, a scheduling function, or the like. The communication processing unit 35 corresponds to, for example, each layer of L1, MAC, RLC, and PDCP. The communication processing unit 35 transmits a signal transmitted from the control unit for transmission line between base stations 34 to the radio terminal via the IF 32. In addition, the communication processing unit 35 receives the signal transmitted from the radio terminal via the IF 32, and then outputs the received signal to the control unit for transmission line between base stations 34.

Operation Example of Radio Communication System

Figure 6:
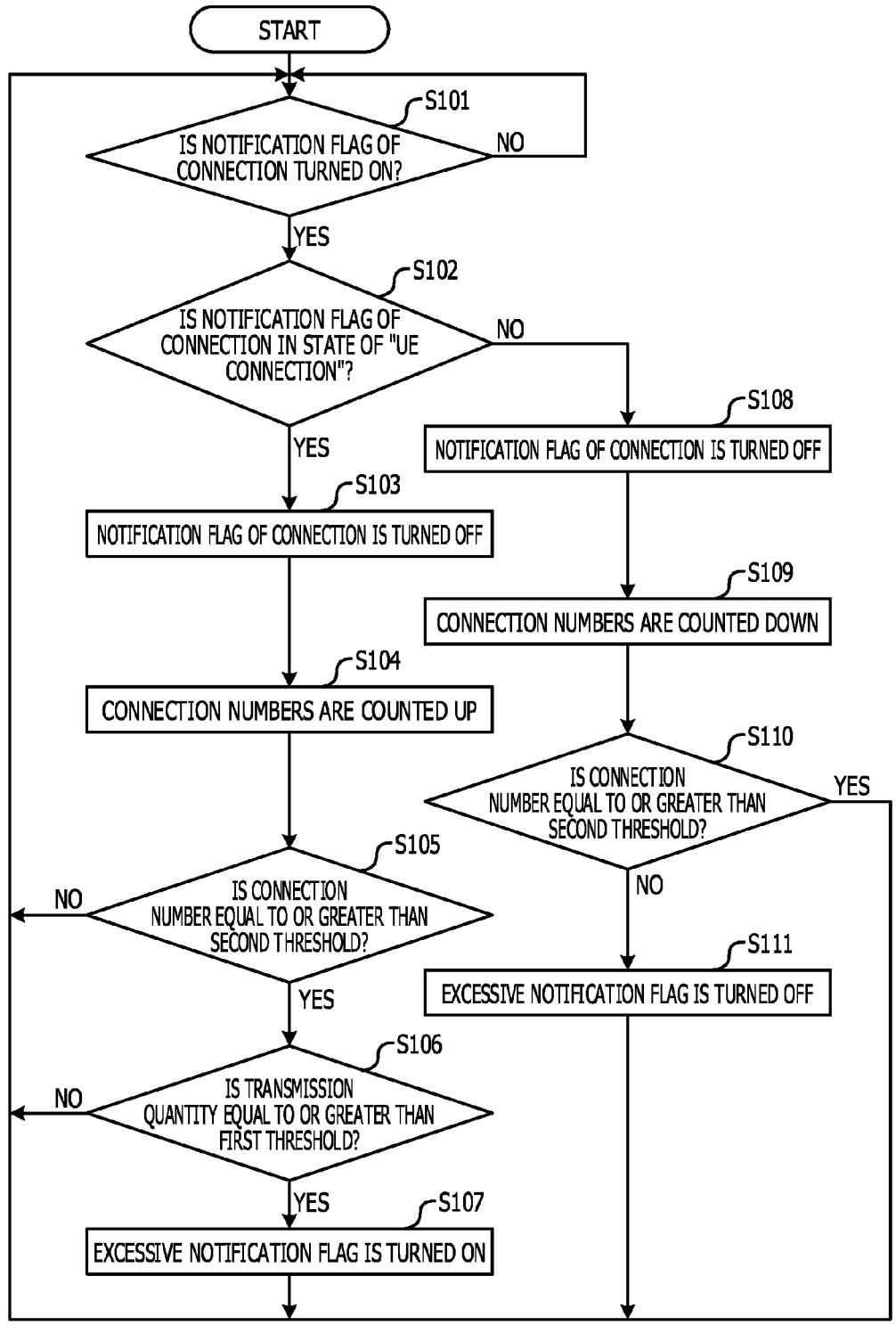
FIG. 6 is a flow chart illustrating an example of a processing operation of the first radio base station relating to a determination of load of a transmission line between base stations.
Figure 7:
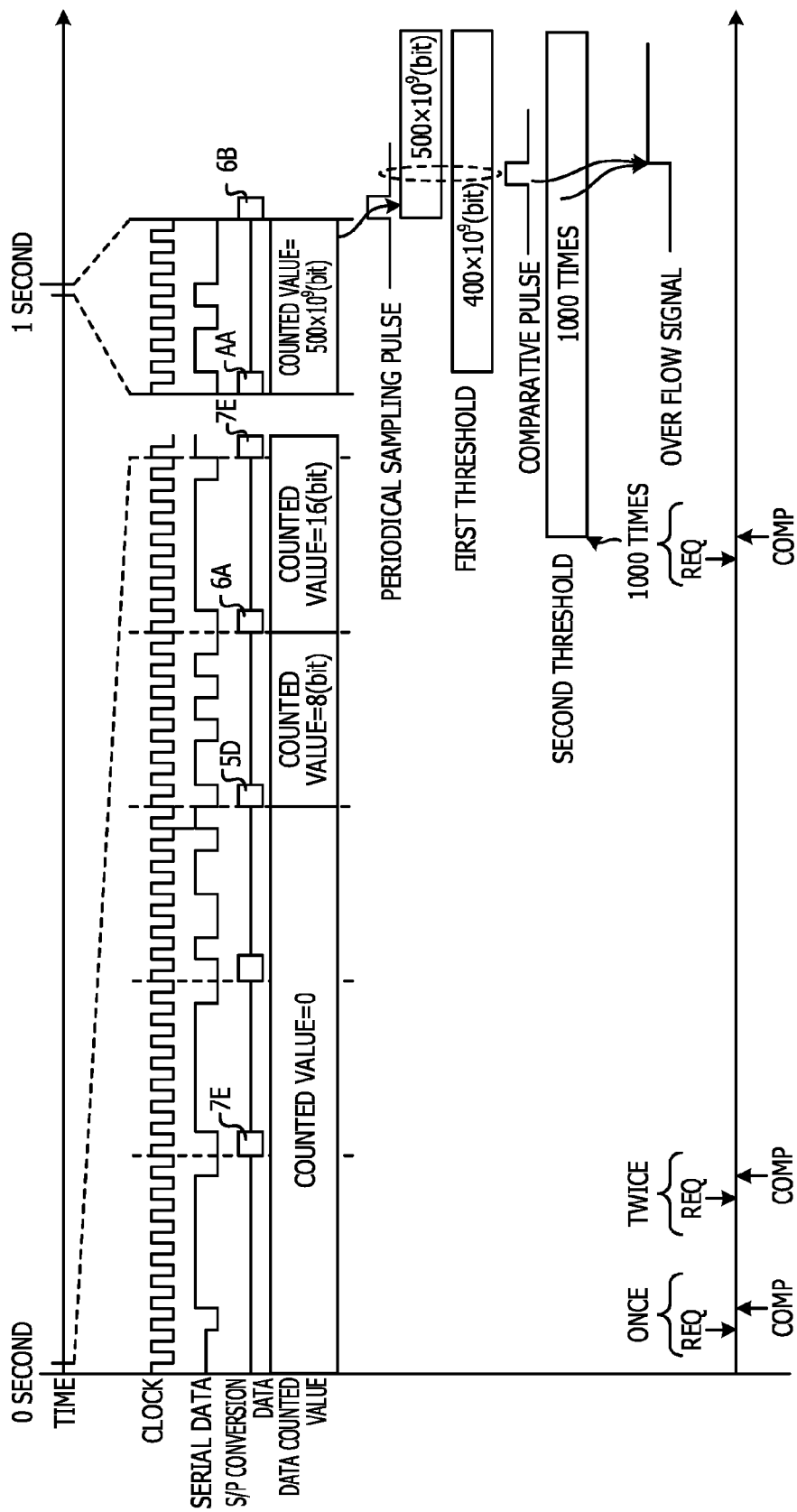
FIG. 7 is a diagram explaining determination of load processing for the transmission line between base stations according to the first radio base station in Example 1.
Figure 8:
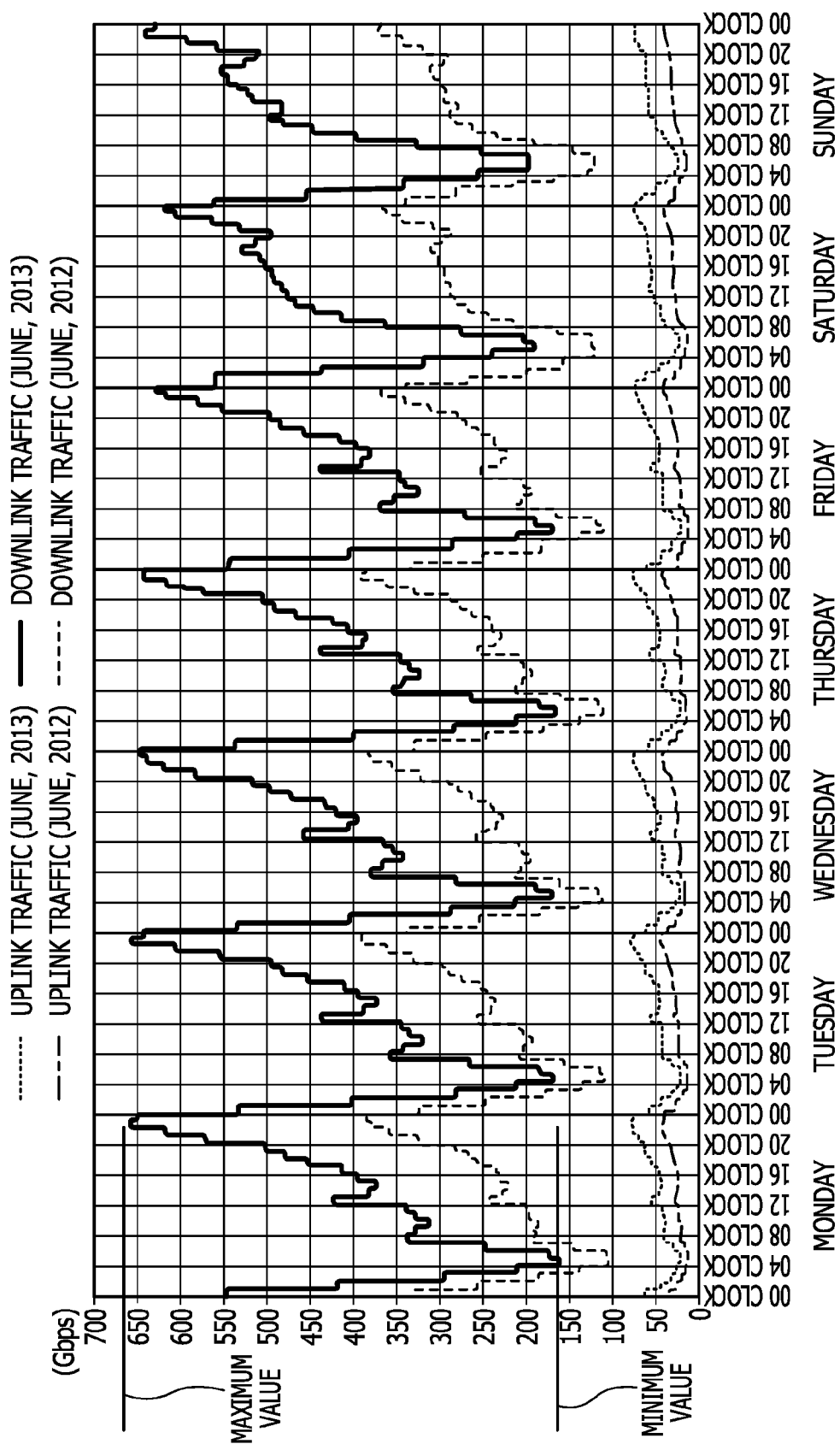
FIG. 8 is a diagram explaining a first threshold used in the first radio base station in Example 1.
Figure 9:
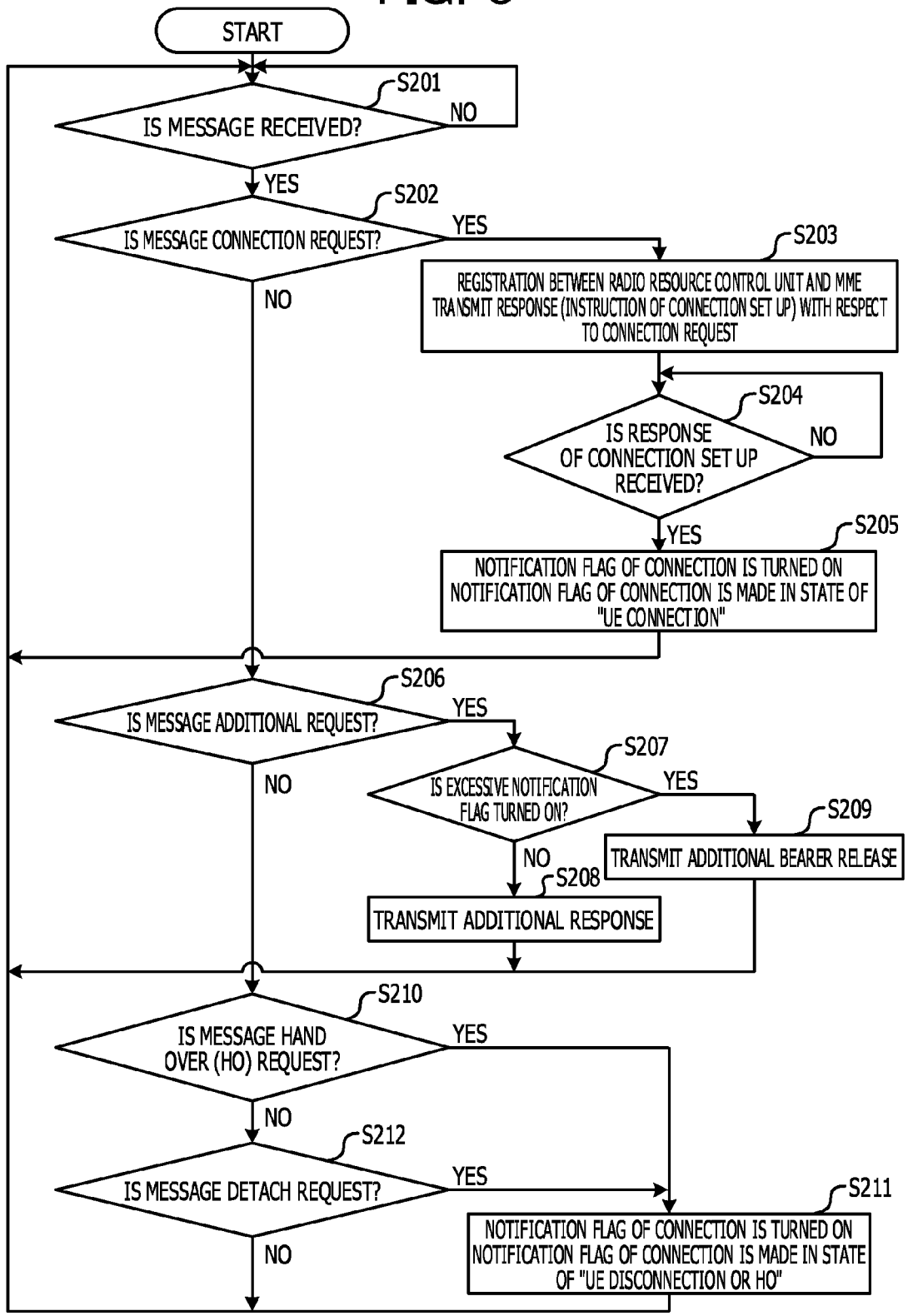
FIG. 9 is a flow chart illustrating an example of the processing operation of the first radio base station relating to load control of the transmission line between base stations.
Figure 10A:
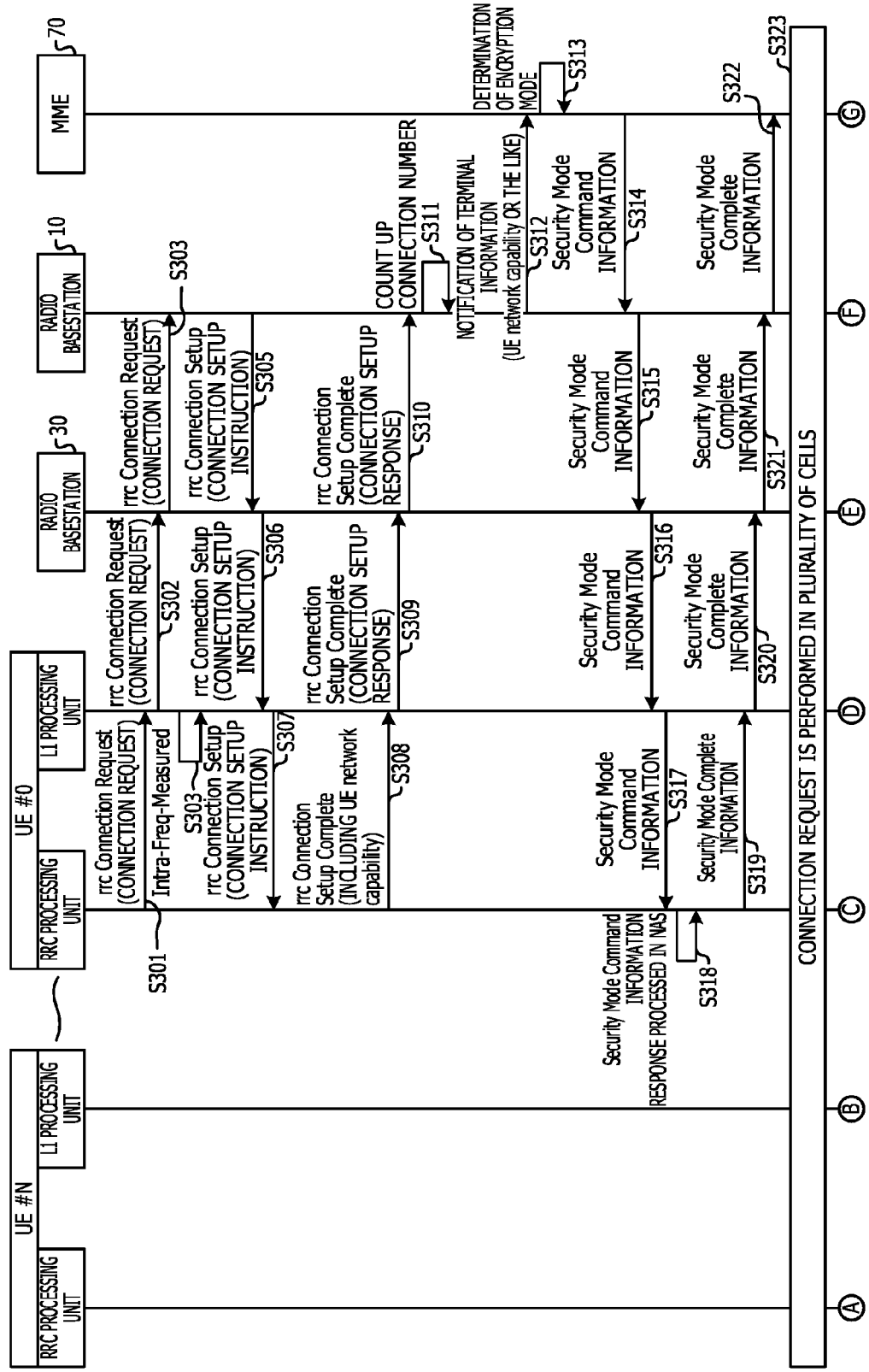
FIGS. 10A and 10B are a sequence diagram illustrating an example of the processing operation of a radio communication system in Example 1.
Figure 10B:
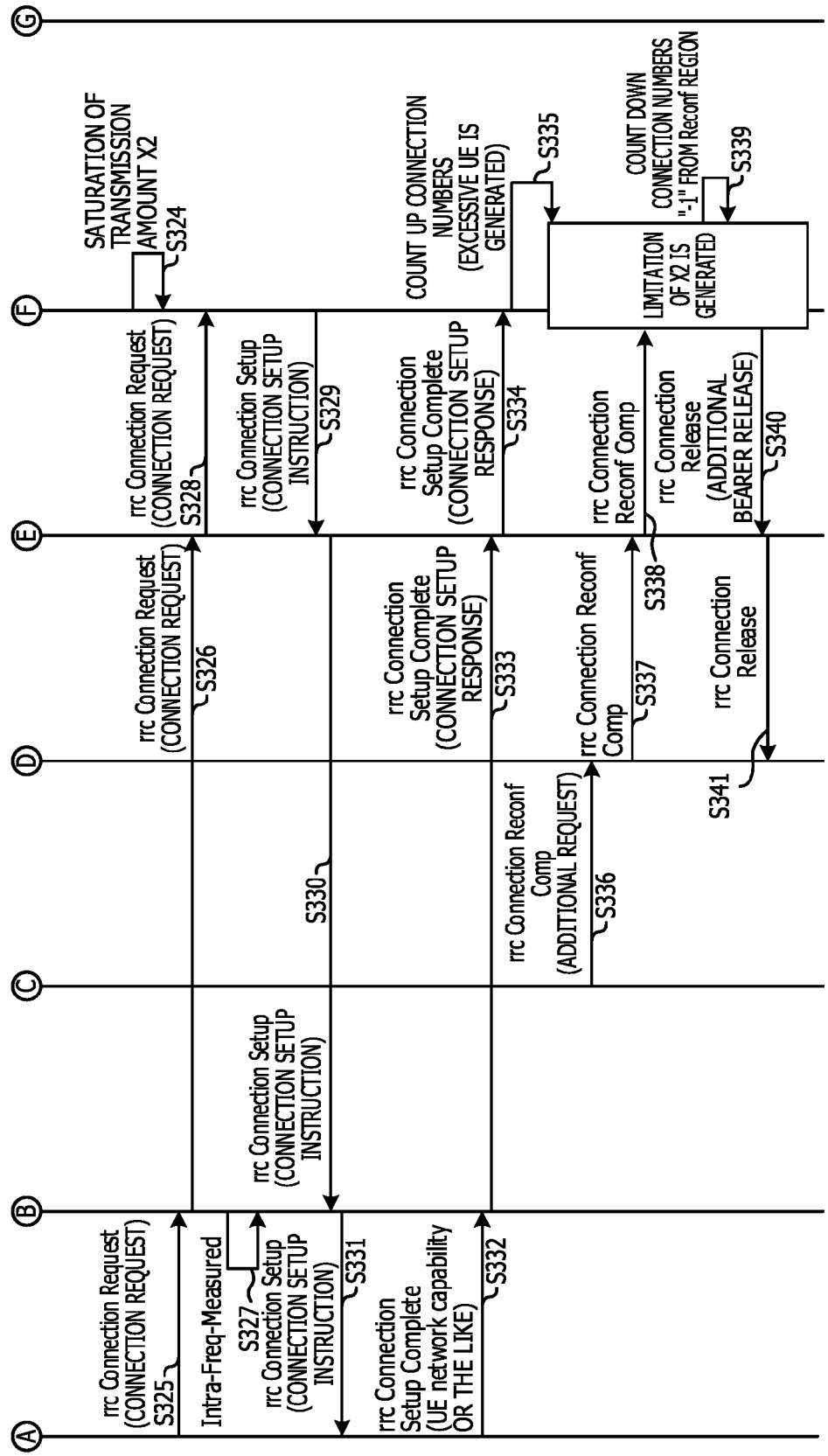

An example of a processing operation of a radio communication system 1 with the above-described configuration will be described. Mainly, the first radio base station, that is, an example of the processing operation of the radio base station 10 will be described. FIG. 6 is a flow chart illustrating an example of a processing operation of the first radio base station relating to a determination of load of a transmission line between base stations. FIG. 7 is a diagram explaining determination of load processing for the transmission line between base stations according to the first radio base station. FIG. 8 is a diagram explaining a first threshold used in the first radio base station. FIG. 9 is a flow chart illustrating an example of the processing operation of the first radio base station relating to load control of the transmission line between base stations. FIG. 10 is a sequence diagram illustrating an example of the processing operation of a radio communication system.

Determination of Load of Transmission Line Between Base Stations

The determination of load of the transmission line between base stations will be described with reference to FIG. 6 and FIG. 7.

The radio resource control unit 16 waits until a "notification flag of connection" is turned ON (No in step S101) and determines whether or not the notification flag of connection is in a state of a "UE connection" (in step S102) when the "notification flag of connection" is turned ON (Yes in step S101).

In a case where the notification flag of connection is in the state of the "UE connection" (Yes in step S102), the radio resource control unit 16 makes the notification flag of connection turned OFF (in step S103) and counts up the number of the radio terminals (that is, the connection number) which are wirelessly connected to the radio base station 10 (in step S104). In other words, as illustrated in the lowermost stage of FIG. 7, when a "connection request (REQ in FIG. 7)" and a "connection response (COMP in FIG. 7)" are received, the radio resource control unit 16 makes the notification flag of connection turned ON and makes the notification flag of connection be in the state of the "UE connection", and thus counts up the connection number.

In addition, the radio resource control unit 16 determines whether or not the counted connection number is equal to or greater than the second threshold (in step S105). In a case where the counted connection number is equal to or greater than the second threshold (Yes in step S105), the radio resource control unit 16 determines whether or not the transmission quantity acquired from the control unit for transmission line between base stations 15 is equal to or greater than the first threshold (in step S106). In other words, as illustrated in FIG. 7, the IF 13 counts bit numbers of portions between sequence synchronizations "7E", and counted values are output to the control unit for transmission line between base stations 15. Then, the control unit for transmission line between base stations 15 compares the acquired transmission quantity with the first threshold when a periodical sampling pulse is generated. Then, in a case where the acquired transmission quantity is equal to or greater than the first threshold, the control unit for transmission line between base stations 15 generates a "comparative pulse" and then outputs the "comparative pulse" to the radio resource control unit 16. Then, when the radio resource control unit 16 receives the "comparative pulse", the radio resource control unit 16 compares the counted connection number with the second threshold. When the counted connection number is equal to or greater than the second threshold, an overflow signal, that is, a signal which indicates the load of the transmission line between base stations being equal to or greater than the threshold is generated.

In a case where the transmission quantity is equal to or greater than the first threshold (Yes in step S106), the radio resource control unit 16 makes an "excessive notification flag" turned ON (in step S107). Then, the processing flow returns to step S101. Meanwhile, when the acquired transmission quantity is less than the second threshold (No in step S105), or the counted connection number is less than the first threshold (No in step S106), the processing flow returns to step S101.

In a case where the notification flag of connection is not in the state of the "UE connection" (No in step S102), that is, when the notification flag of connection is in the state of a "UE disconnection" or a "handover(HO)", the radio resource control unit 16 makes the notification flag of connection turned OFF (in step S108), and counts down the number of the radio terminals (that is, the connection number) which are wirelessly connected to the radio base station 10 (in step S109).

Then, the radio resource control unit 16 determines whether or not the counted connection number is equal to or greater than the second threshold (in step S110). When the counted connection number is less than the second threshold (No in step S110), the radio resource control unit 16 makes the "excessive notification flag" turned OFF (in step S111). Meanwhile, when the counted connection number is equal to or greater than the second threshold (Yes in step S110), the processing flow returns to step S101.

Here, as illustrated in FIG. 8, the radio resource control unit 16 may accumulate daily measured transmission quantity in the IF 13 in advance, and then calculate the first threshold based on the maximum value and the minimum value of the accumulated daily measured transmission quantity. For example, the radio resource control unit 16 may calculate an average value of the maximum value and the minimum value of the transmission quantity in one day, as the first threshold.

Control of the Load of the Transmission Line Between Base Stations

The control of the load of the transmission line between base stations will be described with reference to FIG. 9.

The radio resource control unit 16 waits until receiving a message (No in step S201), and when receiving the message (Yes in step S201), determines whether or not the received message is the "connection request", that is, the aforementioned default request (in step S202).

In a case where the received message is the "connection request" (Yes in step S202), the radio resource control unit 16 performs registration of the radio terminal which is a connection request source between the radio resource control unit 16 and the MME 70, and transmits the aforementioned default response (that is, the instruction of connection set up) with respect to the connection request to the radio terminal of the connection request source (in step S203).

In addition, the radio resource control unit 16 waits until receiving a response of the connection set up (No in step S204), and when receiving the response of the connection set up (Yes in step S204), the radio resource control unit 16 makes the notification flag of connection turned ON and makes the notification flag of connection be in the state of the "UE connection" (in step S205). Then, the processing flow returns to step S201.

In a case where the received message is not the "connection request" (No in step S202), the radio resource control unit 16 determines whether or not the received message is the aforementioned "additional request", that is, "rrc Connection Reconf Comp" (in step S206).

In a case where the received message is the "additional request" (Yes in step S206), the radio resource control unit 16 determines whether or not the "excessive notification flag" is turned ON (in step S207).

In a case where the "excessive notification flag" is not turned ON (No in step S207), the radio resource control unit 16 transmits the aforementioned "additional response" to the radio terminal of the additional request source (in step S208).

On the other hand, in a case where the "excessive notification flag" is turned ON (Yes in step S207), the radio resource control unit 16 transmits the aforementioned "additional bearer release", that is, "rrc Connection Release" to the radio terminal of the additional request source (in step S209). Then, the processing flow returns to step S201.

In a case where the received message is not the "additional request" (No in step S206), the radio resource control unit 16 determines whether or not the received message is the "handover (HO) request" (in step S210). In a case where the received message is the "handover request" (Yes in step S210), the radio resource control unit 16 makes the notification flag of connection turned ON and makes the notification flag of connection in a state of "HO" (in step S211).

In a case where the received message is not the "handover request" (No in step S210), the radio resource control unit 16 determines whether or not the received message is a "detach request" (in step S212). In a case where the received message is the "detach request" (Yes in step S212), the radio resource control unit 16 makes the notification flag of connection turned ON and makes the notification flag of connection be in the state of the "UE disconnection" (in step S211). Then, the processing flow returns to step S201. Note that, even in a case where the received message is not the "detach request" (No in step S212), the processing flow returns to step S201.

Processing Operation of Radio Communication System

The processing operation of the radio communication system will be described with reference to the sequence diagram of FIG. 10. In FIG. 10, UE #0 to #N are a plurality of radio terminals (including the aforementioned radio terminal 50) which are within a coverage area of the radio base station 10 and the radio base station 30.

An RRC processing unit of the UE #0 transmits "rrc Connection Request (that is, the connection request)" to the radio base station 30 via an L1 processing unit (in steps S301 and S302). In addition, the L1 processing unit of the UE #0 performs the measurement of intra frequency (Intra-Frequency-Measured) (in step S303).

The radio base station 30 transmits the "rrc Connection Request" received from the UE #0 to the radio base station 10 through the transmission line between base stations (in step S304).

When the radio resource control unit 16 of the radio base station 10 receives the "rrc Connection Request", the "rrc Connection Setup (that is, the instruction of connection set up)" is transmitted to the UE #0 via the radio base station 30 (in steps S305 and S306).

When the L1 processing unit of the UE #0 receives "rrc Connection Setup" transmitted from the radio base station 30, the "rrc Connection Setup" is output to the RRC processing unit (in step S307).

When the RRC processing unit of the UE #0 receives the "rrc Connection Setup", "rrc Connection Setup Complete (that is, the response of the set up)" is transmitted to the radio base station 30 via the L1 processing unit (in steps S308 and S309). The "rrc Connection Setup Complete" includes information indicating the terminal function of the UE #0 (that is, UE network capability).

The radio base station 30 transmits the "rrc Connection Setup Complete" received from the UE #0 to the radio base station 10 through the transmission line between base stations (in step S310).

When the radio resource control unit 16 of the radio base station 10 receives the "rrc Connection Setup Complete (that is, the response of the set up), the radio resource control unit 16 counts up the connection numbers (in step S311). In addition, the radio resource control unit 16 transmits the terminal information notification (including UE network capability or the like) to the MME 70 (in step S312). Due to this, registration of the UE #0 is performed.

The MME 70 determines an encryption mode (in step S313), and transmits information of "Security Mode Command" to the UE #0 via the radio base station 10, the transmission line between base stations, and the radio base station 30 (in steps S314, S315, and S316).

When the L1 processing unit of the UE #0 receives the information of "Security Mode Command" transmitted from the radio base station 30, the information of "Security Mode Command" is output to the RRC processing unit (in step S317).

When the RRC processing unit of the UE #0 receives the information of "Security Mode Command", the information of the "Security Mode Command" is processed in the NAS, and then the information of "Security Mode Complete" is output to the L1 processing unit (in steps S318 and S319).

The L1 processing unit of the UE #0 transmits the information of the "Security Mode Complete" received from the RRC processing unit to the MME 70 via the radio base station 30, the transmission line between base stations, and the radio base station 10 (in steps S320, S321, and S322).

The steps of the connection request described above are performed in a plurality of cells (in step S323). Here, "saturation of transmission amount X2" is detected according to the radio resource control unit 16 of the radio base station 10, in other words, the transmission quantity is detected to be equal to or greater than the first threshold (in step S324).

The RRC processing unit of the UE #N transmits the "rrc Connection Request (that is, the connection request)" to the radio base station 30 via the L1 processing unit (in steps S325 and S326). In addition, the L1 processing unit of the UE #N performs the measurement of the intra frequency (Intra-Frequency-Measured) (in step S327).

The radio base station 30 transmits the "rrc Connection Request" received from the UE #N to the radio base station 10 through the transmission line between base stations (in step S328).

When the radio resource control unit 16 of the radio base station 10 receives the "rrc Connection Request", the "rrc Connection Setup (that is, the instruction of connection set up)" is transmitted to the UE #N via the radio base station 30 (in steps S329 and S330).

When the L1 processing unit of the UE #N receives the "rrc Connection Setup" transmitted from the radio base station 30, the "rrc Connection Setup" is output to the RRC processing unit (in step S331).

When the RRC processing unit of the UE #N receives the "rrc Connection Setup", the "rrc Connection Setup Complete (that is, the response of the set up)" is transmitted to the radio base station 30 via the L1 processing unit (in steps S332 and S333). The "rrc Connection Setup Complete" includes the information indicating the terminal capability of the UE #N (that is, the UE network capability).

The radio base station 30 transmits the "rrc Connection Setup Complete" received from the UE #N to the radio base station 10 through the transmission line between base stations (in step S334).

When the radio resource control unit 16 of the radio base station 10 receives "rrc Connection Setup Complete (that is, the response of the set up), the radio resource control unit 16 counts up the connection numbers (in step S335). Here, it is assumed that the radio resource control unit 16 detects "excessive UE", that is, the counted connection number being equal to or greater than the second threshold. Due to this, the radio base station 30 transitions to "limitation of X2", that is, a state where the control of limiting the transmission quantity in the transmission line between base stations is performed.

The RRC processing unit of the UE #0 transmits the "rrc Connection Reconf Comp (that is, the additional request)" to the radio base station 30 via the L1 processing unit (in steps S336 and S337).

The radio base station 30 transmits "rrc Connection Reconf Comp" received from the UE #0 to the radio base station 10 through the transmission line between base stations (in step S338).

The radio resource control unit 16 of the radio base station 10 receives the "rrc Connection Reconf Comp". Here, since the transmission quantity is equal to or greater than the first threshold and the counted connection number is equal to or greater than the second threshold, the radio resource control unit 16 counts down the connection number (in step S339) and the "rrc Connection Release (that is, the additional bearer release)" is transmitted to the UE #0 through the transmission line between base stations and the radio base station 30 (in steps S340 and S341). When receiving the "rrc Connection Release", the UE #0 which is the transmission source of the additional request makes the additional request ineffective.

According to the present embodiment as described above, in the radio base station 10, the radio resource control unit 16 performs control of the release of the bearer of the radio base station 10 additionally requested from the radio terminal when the load of the transmission line between base stations is equal to or greater than a predetermined level between the radio resource control unit 16 and the radio base station 30. In other words, when the load of the transmission line between base stations is equal to or greater than a predetermined level between the radio resource control unit 16 and the radio base station 30, the radio resource control unit 16 controls the radio terminal which is the transmission source of the additional request to make the additional request ineffective. For example, when the load of the transmission line between base stations is equal to or greater than a predetermined level between the radio resource control unit 16 and the radio base station 30, the radio resource control unit 16 transmits the additional bearer release to the radio terminal which is the transmission source of the additional request, and thus causes the radio terminal which is the transmission source of the additional request to make the additional request ineffective.

With such a configuration of the radio base station 10, since the establishment of the additional bearer which is mainly used for the transmission of the user data is limited, it is possible to reduce the user data transmitted through the transmission line between base stations. As a result, since the amount of the user data which becomes a transmission competitor of the control signal is reduced in the transmission line between base stations, it is possible to decrease a transmission delay of the control signal.

In addition, the radio resource control unit 16 counts the number of the radio terminals which are wirelessly connected to the radio base station 10, and determines that the load of the transmission line between base stations is equal to or greater than a predetermined level when the transmission quantity acquired from the control unit for transmission line between base stations 15 is equal to or greater than the first threshold and the counted number of the radio terminals is equal to or greater than the second threshold.

With such a configuration of the radio base station 10, in a case of a large amount of the transmission quantity of the transmission line between base stations and a plurality of terminals relating to the transmission in the transmission line between base stations, it is possible to perform the control of the release of the additionally requested bearer.

Note that, as described above, the radio resource control unit 16 may transmit a message indicating the release of the bearer of the radio base station 10 (that is, the additional bearer release) to the radio terminal which is the transmission source of the additional request, with respect to the radio base station 30. This is realized by the radio resource control unit 16 transmitting the aforementioned "throughput control signal" with respect to the radio base station 30. When the control unit for transmission line between base stations 34 of the radio base station 30 receives the "throughput control signal", the state of the control unit for transmission line between base stations 34 of the radio base station 30 transitions to the "overflow state". Then, when the control unit for transmission line between base stations 34 of the radio base station 30 receives the "additional request" of the bearer of the radio base station 10 from the radio terminal, the "additional bearer release" is transmitted to the radio terminal which is the transmission source of the additional request as the response with respect to the additional request.

Example 2

In Example 2, based on a priority in accordance with a "type" of the transmission signal, the transmission signal is transmitted through the transmission line between base stations.

Outline of Radio Communication System

Figure 11:
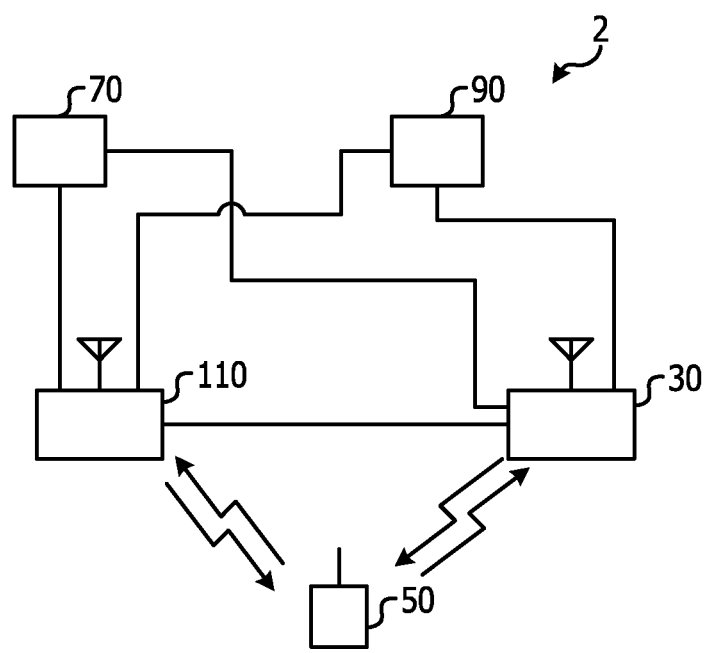
FIG. 11 is a diagram illustrating an example of a radio communication system in Example 2.

FIG. 11 is a diagram illustrating an example of a radio communication system in Example 2. In FIG. 11, the radio communication system 2 basically has the same configuration as that of the radio communication system 1 in Example 1. In FIG. 11, the radio communication system 2 includes a radio base station 110. The radio base station 110 is assumed to communicate with the radio terminal 50 via the radio base station 30. Meanwhile, a radio transmission line may be further used to directly connect the radio base station 110 and the radio terminal 50 in this communication. In addition, in the following description, the radio base station 110 is referred to as a "first radio base station" and the radio base station 30 is referred to as a "second radio base station" in some cases. Further, for example, the radio base station 110 is the aforementioned master radio base station, and the radio base station 30 is the aforementioned slave radio base station.

The radio base station 110 is configured to be able to perform the same operation as that of the radio base station 10 in Example 1. Further, in a case where the radio base station 110 transmits a signal through the transmission line between base stations between the radio base station 110 and the radio base station 30, the transmission signal is transmitted based on the priority in accordance to the "type" of the transmission signal. For example, when the radio base station 110 transmits the data signal and the control signal to the transmission line between base stations, the control signal is transmitted more preferentially than the data signal. In other words, in a case where the radio base station 110 has the data signal and the control signal to be transmitted, transmits the control signal to the transmission line between base stations, and then outputs the data signal to the transmission line between base stations.

As described above, by transmitting the control signal more preferentially than the data signal to the transmission line between base stations, it is possible to decrease a transmission delay of the control signal.

Configuration Example of First Radio Base Station

Figure 12:
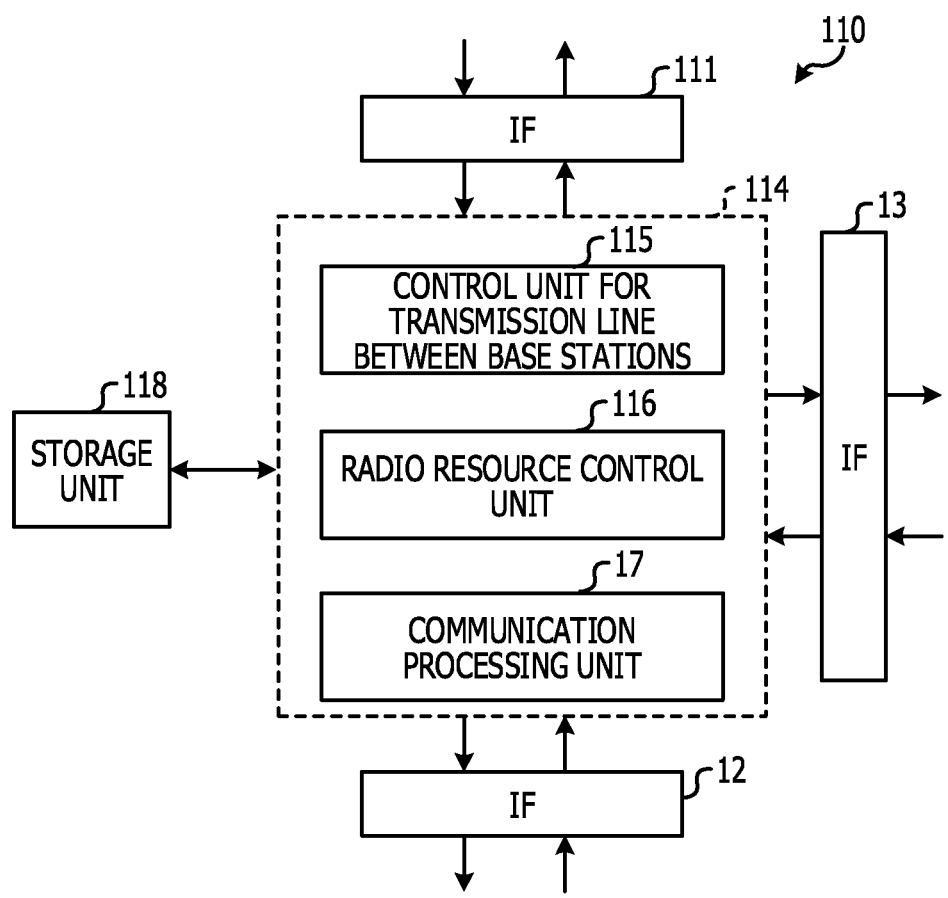
FIG. 12 is a block diagram illustrating an example of a first radio base station in Example 2.

FIG. 12 is a block diagram illustrating an example of a first radio base station in Example 2. In FIG. 12, the radio base station 110 includes an IF 111, a control unit 114, and a storage unit 118. The control unit 114 includes a control unit for transmission line between base stations 115, and a radio resource control unit 116.

The IF 111 adds priority information in accordance with a "type" of a signal received from the core network side to the received signal, and then outputs the received signal with the priority information added thereto to the control unit 114. For example, the IF 111 adds priority information indicating high priority with respect to the control signal compare to the data signal. The IF 111 determines a "type" of the received signal based on the transmission source information of the received signal. Note that in the IF 111, the priority of the data signal when receiving the notification signal indicating the "overflow state" from the radio resource control unit 116 may be lower than the priority of the data signal when not receiving the notification signal indicating "the overflow state" from the radio resource control unit 116.

The radio resource control unit 116 adds the priority information in accordance with the "type" of the control signal with respect to the control signal being transmitted with respect to the radio terminal which is within a coverage area of the radio base station 110 through the transmission line between base stations. For example, the radio resource control unit 116 adds the priority information indicating high priority compared to the data signal to the control signal. In addition, in a case where the radio resource control unit 116 is in the "overflow state", that is, the "load of the transmission line between base stations is equal to or greater than a predetermined level", the notification signal indicating the "overflow state" may be output to the IF 111.

In a case where the data signal and the control signal which are received from the IF 111 and the radio resource control unit 116 are transmitted to the transmission line between base stations, the control unit for transmission line between base stations 115 transmits the control signal more preferentially than the data signal.

Figure 13:
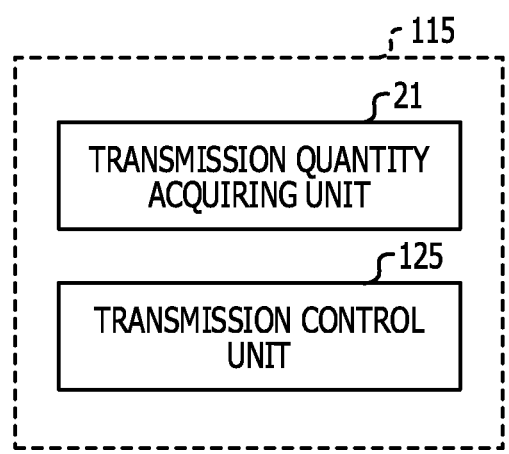
FIG. 13 is a block diagram illustrating an example of a control unit for transmission line between base stations in Example 2.

The control unit for transmission line between base stations 115 includes, as illustrated in FIG. 13, a transmission control unit 125. FIG. 13 is a block diagram illustrating an example of a control unit for transmission line between base stations in Example 2.

For example, the transmission control unit 125 causes the signal to which the priority information is added by the radio resource control unit 116 and the control unit for transmission line between base stations 115 to be stored in a storage region (that is, a transmission buffer) of a storage unit 118 which is different for each priority. Then, the transmission control unit 125 transmits the signal stored in the storage region to the transmission line between base stations in order from the storage region with the high priority. Meanwhile, a plurality of storage regions corresponding to a plurality of priorities may be a physically different memory, or may be logically different regions in one memory.

Operation Example of First Radio Base Station

An example of the processing operation of the radio base station 110 having the above described configuration will be described. FIG. 14 is a diagram explaining an example of a processing operation of the first radio base station in Example 2.

In the example illustrated in FIG. 14, as "type" of a signal, four types are provided such as an L1 control packet, an NAS packet, normal data, and normal data when the overflow occurs. Then, Priorities 1 to 4 are respectively allocated to the L1 control packet, the NAS packet, the normal data, and the normal data when the overflow occurs. The priority of Priority 1 is the highest and the priority of Priority 4 is the lowest.

In addition, according to a Table in FIG. 14, the radio resource control unit 116 imparts priority information of Priority 1 with respect to the L1 control packet of which the transmission source is the radio resource control unit 116, that is, which is generated by the radio resource control unit 116.

In addition, when the IF 111 receives the NAS packet of which the transmission source is the MME 70, the IF 111 imparts priority information of Priority 2 with respect to the NAS packet. Further, when the IF 111 receives the data signal (that is, normal data) of which the transmission source is other than the MME 70, in a case where the notification signal indicating the "overflow state" is not received from the radio resource control unit 116, the IF 111 imparts priority information of Priority 3 with respect to the data signal. In addition, when the IF 111 receives the data signal (that is, normal data) of which the transmission source is other than the MME 70, in a case where the notification signal indicating the "overflow state" is not received from the radio resource control unit 116, the IF 111 imparts priority information of Priority 4 with respect to the data signal.

In addition, the control unit for transmission line between base stations 115 transmits the signals to the transmission line between base stations in order from the signal with high priority indicating the imparted priority information, that is, in order of the Priorities 1, 2, 3, and 4.

According to the present embodiment as described above, in the radio base station 110, the control unit for transmission line between base stations 115 transmits the control signal more preferentially than the data signal in a case where the data signal and the control signal are transmitted to the transmission line between base stations.

With such a configuration of the radio base station 110, it is possible to decrease a transmission delay of the control signal by transmitting the control signal more preferentially than the data signal to the transmission line between base stations. Note that, the above description is made by assuming that the radio base station 110 has the same function as the radio base station 10 in Example 1, but is not limited thereto. In other words, the above described effect is achieved as long as the radio base station 110 has a function of transmitting the control signal more preferentially than the data signal, even in a case of not having a function of transmitting the additional bearer release.

Other Examples

Respective components of portions illustrated in Example 1 and Example 2 may not be physically configured as illustrated in drawings. In other words, the specific mode of distribution and integration of each portion is not limited to the drawings, it is possible to configure a whole or a part of portions by functionally or physically distributing or integrating in an arbitrary unit depending on various loads, use conditions, or the like.

Further, various processing functions performed in the respective devices may be performed in whole or partially performed in the central processing unit (CPU) (or the microcomputer such as a micro processing unit (MPU) and a micro controller unit (MCU)). In addition, various processing functions may be performed in whole or partially performed in the program analyzed by the central processing unit (CPU) (or the microcomputer such as the MPU and the MCU) or in the hardware by the wired logic.

The radio base stations of Example 1 and Example 2 may be realized by, for example, the following hardware configuration.

Figure 15:
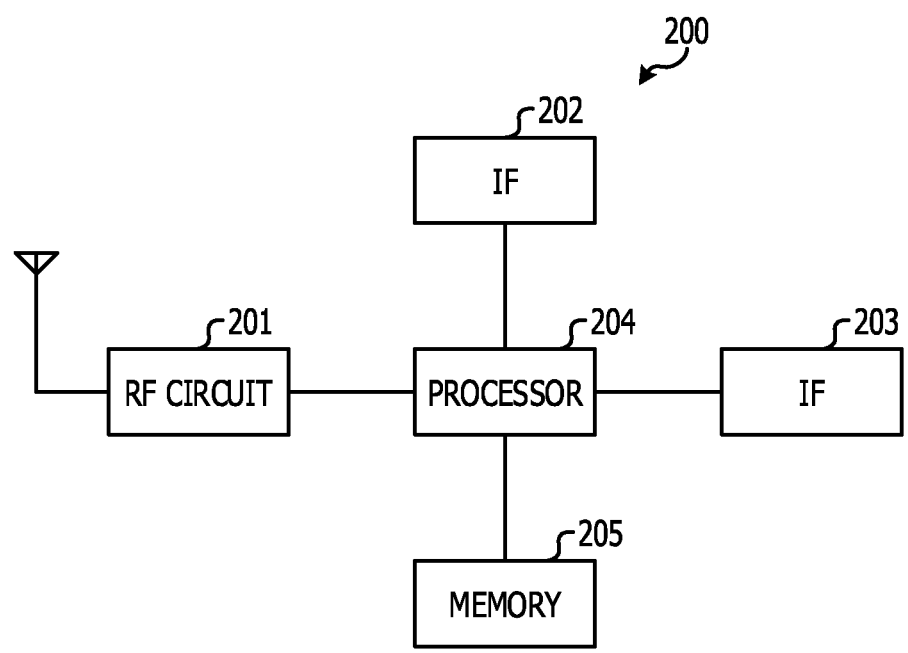
FIG. 15 is a diagram illustrating a configuration example of hardware of the radio base station.

FIG. 15 is a diagram illustrating a configuration example of hardware of the radio base station. As illustrated in FIG. 15, the radio base station 200 includes a radio frequency (RF) circuit 201, Inter Faces (IFs) 202 and 203, a processor 204, and a memory 205. Examples of the processor 204 are a CPU, a digital signal processor (DSP), a field programmable gate array (FPGA), or the like. In addition, examples of the memory 205 are a random access memory (RAM) such as a synchronous dynamic random access memory (SDRAM), a read only memory (ROM), a flash memory, or the like. The radio base stations 10 and 30 in Example 1 and the radio base station 110 in Example 2 have the hardware configuration as illustrated in FIG. 15.

Further, various processing functions performed by the radio base stations in Example 1 and in Example 2 may be realized by performing a program stored in various memories such as a nonvolatile storage medium by a processor included in an amplifier. In other words, programs corresponding to each process performed by the control units 14, 33, and 114 may be stored in the memory 205 and the program may be performed by the processor 204. In addition, the IFs 12 and 32 are realized by the RF circuit 201. Further, the IFs 11 and 111 are realized by the IF 202. Moreover, the IFs 13 and 31 are realized by the IF 203.

Note that, the control unit for transmission line between base stations 15, the control unit for transmission line between base stations 115, and the communication processing unit 17 each are realized by different hardware (that is, an accelerator) from that of the processor 204.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A radio base station comprising:
a first interface configured to communicate with a different radio base station via a network among radio base stations;
a second interface configured to wirelessly communicate with a radio terminal; and
a processor configured to control a transmission of a first signal to the radio terminal when a load of the network among the radio base stations is higher than a given level, the first signal indicating to reject a second signal transmitted from the radio terminal, the second signal requesting to add a bearer between the radio base station and the radio terminal via the different radio base station.
2. The radio base station according to claim 1, wherein the processor is configured to detect that the load of the network among the radio base stations is higher than the given level, when a transmission rate of the network among the radio base stations is higher than a first threshold and a counted number of radio terminals coupling to the radio base station is higher than a second threshold.
3. The radio base station according to claim 1, wherein the processor is configured, when transmitting a signal received from a core network to the network among the radio base stations, to transmit a control signal included in the received signal more preferentially than a data signal included in the received signal.
4. The radio base station according to claim 1, wherein the processor is configured to request the different radio base station to transmit the first signal to the radio terminal.
5. The radio base station according to claim 2, wherein the processor is configured to measure the transmission rate serially.
6. The radio base station according to claim 1, wherein the processor is configured to transmit the first signal to the radio terminal.
7. The radio base station according to claim 1, wherein the first signal is radio resource control (rrc) Connection Release of Long Term Evolution (LTE).
8. The radio base station according to claim 1, wherein the second signal is radio resource control (rrc) Connection Request of Long Term Evolution (LTE).
9. The radio base station according to claim 3, wherein the control signal is Non-Access Stratum (NAS) signal of Long Term Evolution (LTE).
10. A communication control method comprising:
communicating, by a radio base station, with a different radio base station via a network among radio base stations;
wirelessly communicating, by the radio base station, with a radio terminal; and
controlling, by the radio base station, a transmission of a first signal to the radio terminal when a load of the network among the radio base stations is higher than a given level, the first signal indicating to reject a second signal transmitted from the radio terminal, the second signal requesting to add a bearer between the radio base station and the radio terminal via the different radio base station.
11. The communication control method according to claim 10, further comprising:
detecting that the load of the network among the radio base stations is higher than the given level, when a transmission rate of the network among the radio base stations is higher than a first threshold and a counted number of radio terminals coupling to the radio base station is higher than a second threshold.
12. The communication control method according to claim 10, further comprising:
when the radio base station transmits a signal received from a core network to the network among the radio base stations, transmitting a control signal included in the received signal more preferentially than a data signal included in the received signal.
13. The communication control method according to claim 10, wherein
the radio base station is configured to request the different radio base station to transmit the first signal to the radio terminal.
14. The communication control method according to claim 11, wherein
the radio base station is configured to measure the transmission rate serially.

15. The communication control method according to claim 10, wherein
the radio base station is configured to transmit the first signal to the radio terminal.

16. The communication control method according to claim 10, wherein
the first signal is radio resource control (rrc) Connection Release of Long Term Evolution (LTE).

17. The communication control method according to claim 10, wherein
the second signal is radio resource control (rrc) Connection Request of Long Term Evolution (LTE).

18. The communication control method according to claim 12, wherein
the control signal is Non-Access Stratum (NAS) signal of Long Term Evolution (LTE).

* * * * *